(12) United States Patent
Oba

(10) Patent No.: US 9,964,046 B2
(45) Date of Patent: May 8, 2018

(54) FUEL SYSTEM

(71) Applicant: IHI Corporation, Koto-ku (JP)

(72) Inventor: Daisuke Oba, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days. days.

(21) Appl. No.: 15/059,441

(22) Filed: Mar. 3, 2016

(65) Prior Publication Data

US 2016/0186670 A1 Jun. 30, 2016

Related U.S. Application Data

(63) Continuation of application No. PCT/JP2014/075043, filed on Sep. 22, 2014.

(30) Foreign Application Priority Data

Sep. 25, 2013 (JP) .................................. 2013-198994

(51) Int. Cl.
*F02C 9/26* (2006.01)
*F02C 9/32* (2006.01)
*F04D 15/00* (2006.01)
*F02C 9/30* (2006.01)
*F02C 7/236* (2006.01)
*F04D 1/00* (2006.01)
*F04D 13/02* (2006.01)
*F02C 7/32* (2006.01)
(Continued)

(52) U.S. Cl.
CPC ................ *F02C 9/30* (2013.01); *F02C 7/236* (2013.01); *F02C 7/32* (2013.01); *F02C 9/263* (2013.01); *F02C 9/32* (2013.01); *F04D 1/00* (2013.01); *F04D 7/02* (2013.01); *F04D 13/022* (2013.01); *F04D 13/028* (2013.01); *F04D 13/04* (2013.01); *F04D 15/0022* (2013.01); *F04D 15/0066* (2013.01); *F05D 2260/40* (2013.01); *F05D 2270/301* (2013.01)

(58) Field of Classification Search
CPC ............ F04D 15/0022; F04D 15/0072; F04D 27/003; F04D 27/0253; F02C 9/263; F02C 9/28; F02C 9/32
USPC .................................. 417/15, 213, 364, 380
See application file for complete search history.

(56) References Cited

U.S. PATENT DOCUMENTS 2,629,225 A 2/1953 Ammann
3,596,467 A 8/1971 Avery
(Continued)

FOREIGN PATENT DOCUMENTS

EP 1 965 055 A2 9/2008
JP 64-63624 3/1989
(Continued)

OTHER PUBLICATIONS

International Search Report dated Nov. 25, 2014 in PCT/JP2014/075043, filed Sep. 22, 2014 (with English Translation).

*Primary Examiner* — Peter J Bertheaud
(74) *Attorney, Agent, or Firm* — Oblon, McClelland, Maier & Neustadt, L.L.P.

(57) ABSTRACT

A fuel system includes a centrifugal pump which pressurizes and delivers fuel that is supplied to an aircraft engine, and a transmission which connects the engine and the centrifugal pump to each other, is able to regulate a gear ratio and which modifies and transmits a rotational speed of rotational power that is output from the engine to the centrifugal pump.

6 Claims, 11 Drawing Sheets

(51) Int. Cl.
*F04D 7/02* (2006.01)
*F04D 13/04* (2006.01)

(56) References Cited

U.S. PATENT DOCUMENTS

| | | | |
|---|---|---|---|
| 3,946,551 A | 5/1976 | Linebrink et al. | |
| 4,229,939 A * | 10/1980 | Smith | F02C 9/263 60/243 |
| 4,922,710 A | 5/1990 | Rowen et al. | |
| 5,118,258 A | 6/1992 | Martin | |
| 5,123,810 A | 6/1992 | Hansen | |
| 5,511,956 A | 4/1996 | Hasegawa et al. | |
| 5,545,014 A | 8/1996 | Sundberg et al. | |
| 7,878,003 B1 * | 2/2011 | Smith | F02C 7/224 60/764 |
| 8,205,597 B2 * | 6/2012 | Brocard | F02C 7/22 123/457 |
| 8,484,977 B2 * | 7/2013 | Bader | F02C 7/236 60/39.281 |
| 8,549,863 B2 | 10/2013 | Brocard et al. | |
| 2004/0098988 A1 | 5/2004 | Goi | |
| 2006/0053803 A1 | 3/2006 | Parsons | |
| 2007/0265761 A1 | 11/2007 | Dooley et al. | |
| 2008/0163931 A1 | 7/2008 | Brocard et al. | |
| 2010/0018182 A1 * | 1/2010 | Bader | F02C 7/236 60/39.281 |
| 2010/0126136 A1 | 5/2010 | Anson | |
| 2011/0101693 A1 | 5/2011 | Goi et al. | |
| 2011/0139123 A1 | 6/2011 | Brocard et al. | |
| 2015/0075634 A1 * | 3/2015 | Nyzen | F04B 23/10 137/14 |
| 2015/0125313 A1 * | 5/2015 | Nyzen | F04B 23/10 417/53 |

FOREIGN PATENT DOCUMENTS

| | | |
|---|---|---|
| JP | 2-291433 | 12/1990 |
| JP | 2-305358 | 12/1990 |
| JP | 7-4332 | 1/1995 |
| JP | 7-197888 | 8/1995 |
| JP | 11-247980 | 9/1999 |
| JP | 2002-235558 | 8/2002 |
| JP | 2006-83864 | 3/2006 |
| JP | 2006-138228 | 6/2006 |
| JP | 2008-530442 | 8/2008 |
| JP | 2008-530443 | 8/2008 |
| JP | 2008-215352 | 9/2008 |
| JP | 2011-117437 | 6/2011 |
| JP | 2011-163210 | 8/2011 |
| JP | 2012-117391 | 6/2012 |
| JP | 2012-193693 | 10/2012 |

* cited by examiner

FUEL SYSTEM

This application is a Continuation of International Application No. PCT/JP2014/075043, filed on Sep. 22, 2014, claiming priority based on Japanese Patent Application No. 2013-198994, filed on Sep. 25, 2013, the content of which is incorporated herein by reference in their entirely.

TECHNICAL FIELD

Embodiments described herein relates to a fuel system.

BACKGROUND ART

A fuel system for supplying fuel of a required amount with respect to an engine is mounted in an aircraft. A fuel pump which pressurizes fuel that is discharged from a fuel tank is provided in such a fuel system. A fixed volume pump such as a gear pump or a centrifugal pump is used as such a fuel pump.

As shown in Patent Document 1 and Patent Document 2, for example, a configuration is proposed in which an electric motor is used as a driving source of such a fuel pump. However, it leads to increasing the size and complexity of the fuel system. In addition, the power for driving the electric motor is generated using driving force of the engine, and therefore loss occurs due to power conversion and energy effectiveness is reduced. For this reason, it is desirable that the fuel pump is connected to the engine, and drives using rotational power which is output from the engine.

Patent Document 3 discloses a transmission may be attached to a turbine engine such that the transmission receives rotational input from the turbine engine. In addition, Patent Document 3 discloses the transmission driving a boost pump inducer via a shaft. Furthermore, Patent Document 3 discloses an AC generator is driven by the transmission via the shaft together with the boost pump inducer and a centrifugal pump. However, control of the transmission is not disclosed.

Patent Document 4 discloses linking an input shaft of a fuel injection pump and an output shaft of an engine in a diesel engine via a stepless transmission, and variably controlling the rotational speed of the fuel injection pump in response to fuel pressure in an accumulator. However, an aspect of the present disclosure which will be described later is not disclosed.

Patent Document 5 discloses a fuel system, but the transmission is not disclosed.

CITATION LIST

Patent Document

[Patent Document 1] U.S. Pat. No. 3,946,551
[Patent Document 2] Published Japanese Translation No. 2008-530442 of the PCT International Publication
[Patent Document 3] Japanese Unexamined Patent Application, First Publication No. 2006-083864
[Patent Document 4] Japanese Unexamined Patent Application, First Publication No. S64-63624
[Patent Document 5] Japanese Unexamined Patent Application, First Publication No. H02-291433

SUMMARY

Technical Problem

A centrifugal pump has a characteristic of discharging liquid by discharge pressure which is proportional to the square of the rotational speed.

In addition, in a case where the centrifugal pump is driven by rotational power which is output from the engine, the rotational speed of the engine and the rotational speed of the centrifugal pump are proportional. For this reason, in the case of using the centrifugal pump, a sufficient discharge pressure is obtained in a case where the rotational speed of the engine is high, but there is a possibility that the discharge pressure is insufficient in a case where the rotational speed of the engine is low.

Solution to Problem

To compensate for insufficient discharge pressure of such a centrifugal pump, it is considered to install a fixed volume pump such as a gear pump which obtains a sufficient discharge pressure even if the rotational speed of the engine is low, but in this case, a switching mechanism is also necessary to switch between the centrifugal pump and the fixed volume pump leading to an increase in the size and complexity of the fuel system.

Furthermore, in a case where the fixed volume pump is used, a portion of fuel that is discharged from the fixed volume pump is returned upstream of the fixed volume pump, and at this time, pressure energy is converted into heat. For this reason, the energy effectiveness of the fuel system is reduced.

The present disclosure is carried out in consideration of the above circumstances, and an object thereof is to secure sufficient discharge pressure even when the rotational speed of an engine is low without using a fixed volume pump in a fuel system which has a centrifugal pump that is driven by rotational power which is output from an aircraft engine.

In a first aspect of the present disclosure, a fuel system includes a centrifugal pump which pressurizes and delivers fuel that is supplied to an aircraft engine, a transmission which connects the engine and the centrifugal pump to each other, is able to regulate a gear ratio and modifies and transmits the rotational speed of the rotational power that is output from the engine to the centrifugal pump, a metering valve which regulates a flow amount of the fuel that is discharged from the centrifugal pump, a throttling valve which is provided on the downstream of the metering valve and regulates the pressure of the fuel that passes through the metering valve, and a transmission controller that controls the gear ratio in the transmission according to the pressure of the fuel on an upstream position of the metering valve and the pressure of the fuel on a downstream position of the throttling valve.

In a second aspect of the present disclosure, a fuel system includes a centrifugal pump which pressurizes and delivers fuel that is supplied to an aircraft engine, a transmission which connects the engine and the centrifugal pump to each other, is able to regulate the gear ratio and which modifies and transmits the rotational speed of the rotational power that is output from the engine to the centrifugal pump, a rotational speed sensor which measures the rotational speed of the centrifugal pump, an arithmetic control member which compares the rotational speed of the centrifugal pump which generates a necessary discharge pressure in order to supply the fuel to the engine to a measurement value of the rotational speed sensor, and a transmission controller that controls the gear ratio in the transmission based on the comparison result of the arithmetic control member.

In a third aspect of the present disclosure, a fuel system includes a centrifugal pump which pressurizes and delivers fuel that is supplied to an aircraft engine, a transmission which connects the engine and the centrifugal pump to each other, is able to regulate the gear ratio and modifies and transmits the rotational speed of the rotational power that is output from the engine to the centrifugal pump, a metering valve which regulates a flow amount of the fuel that is discharged from the centrifugal pump, a throttling valve which is provided on the downstream of the metering valve and regulates the pressure of the fuel that passes through the metering valve, a pressure difference sensor which measures a difference between the pressure of the fuel on an upstream position of the metering valve and the pressure of the fuel on a downstream position of the throttling valve, an arithmetic control member which compares a setting value to the measurement result of the pressure difference sensor, and a transmission controller that controls the gear ratio in the transmission based on the comparison result of the arithmetic control member.

In a fourth aspect of the present disclosure, a fuel system includes a centrifugal pump which pressurizes and delivers fuel that is supplied to an aircraft engine, a transmission which connects the engine and the centrifugal pump to each other, is able to regulate the gear ratio and modifies and transmits the rotational speed of the rotational power that is output from the engine to the centrifugal pump, a pressure sensor which measures the pressure of the fuel that is discharged from the centrifugal pump, an arithmetic control member which compares the discharge pressure of the centrifugal pump which is necessary in order to supply the fuel to the engine and a measuring value of the pressure sensor, and a transmission controller that controls the gear ratio in the transmission based on the comparison result of the arithmetic control member.

In a fifth aspect of the present disclosure, a fuel system includes a centrifugal pump which pressurizes and delivers fuel that is supplied to an aircraft engine, a transmission which connects the engine and the centrifugal pump to each other, is able to regulate the gear ratio and modifies and transmits the rotational speed of the rotational power that is output from the engine to the centrifugal pump, a metering valve which regulates a flow amount of the fuel that is discharged from the centrifugal pump, a throttling valve which is provided on the downstream of the metering valve and regulates the pressure of the fuel that passes through the metering valve, a pressure difference sensor which measures a difference between the pressure of the fuel on an upstream position of the metering valve, the pressure of the fuel on a downstream position of the throttling valve and the pressure of the fuel between the metering valve and the throttling valve, an arithmetic control member which compares the setting value to the measurement result of the pressure difference sensor and controls an opening area of the throttling valve, and a transmission controller that controls the gear ratio in the transmission based on the comparison result of the arithmetic control member.

In a sixth aspect of the present disclosure, a fuel system includes a centrifugal pump which pressurizes and delivers fuel that is supplied to an aircraft engine, a transmission which connects the engine and the centrifugal pump to each other, is able to regulate the gear ratio and modifies and transmits the rotational speed of the rotational power that is output from the engine to the centrifugal pump, a flowmeter which measures the flow amount of the fuel that is discharged from the centrifugal pump, a throttling valve which is provided on the downstream of the flowmeter and regulates the pressure of the fuel that passes through the flowmeter, an arithmetic control member which compares the amount of fuel that is necessary for the engine to the measurement result of the flowmeter and controls the opening area of the throttling valve, and a transmission controller that controls the gear ratio in the transmission based on the comparison result of the arithmetic control member.

According to a seventh aspect of the present disclosure, the fuel system further includes an inducer which is disposed on the upstream of the centrifugal pump and drives proportionally to the rotational power that is output from the engine.

According to the present disclosure, the engine and the centrifugal pump are connected via the transmission which is able to regulate the gear ratio. For this reason, it is possible to modify the rotational speed of the centrifugal pump without making the rotational speed of the centrifugal pump proportional to the rotational speed of the engine. Consequently, even in a case where the rotational speed of the engine is low, it is possible to increase the rotational speed of the centrifugal pump, and it is possible to secure a sufficient discharge pressure. According to the present disclosure, it is possible to secure sufficient discharge pressure even when the rotational speed of the engine is low without using a fixed volume pump in a fuel system which has a centrifugal pump which is driven by rotational power that is output from an aircraft engine.

DESCRIPTION OF EMBODIMENTS

Figure 1:
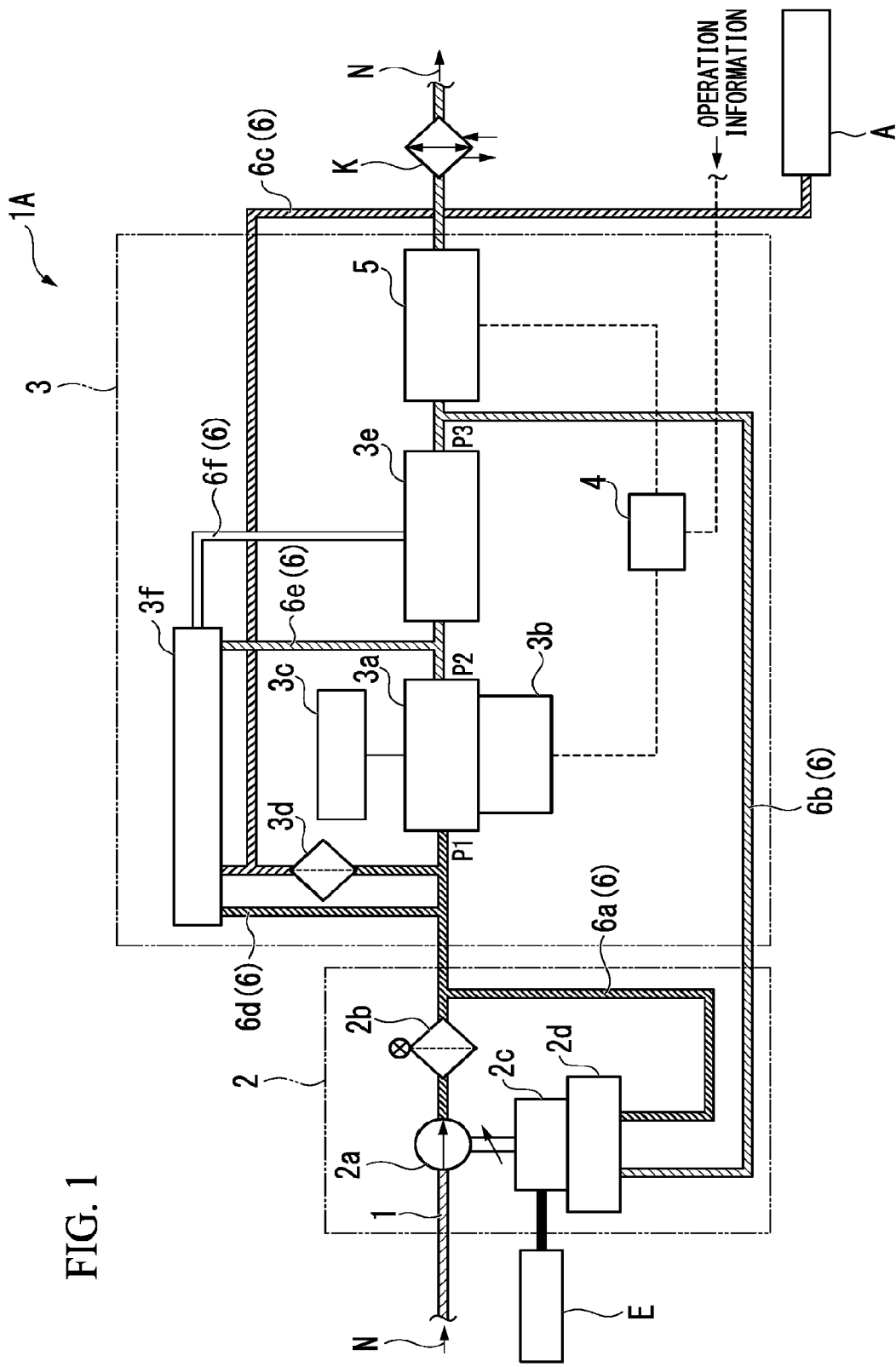
FIG. 1 is a system block diagram showing an outline configuration of a fuel system in a first embodiment of the present embodiment.

Embodiments of a fuel system according to the present disclosure will be described below referring to the drawings. Here, in the drawings described below, the scale of each member is appropriately modified in order for the size of each member to be visually recognizable.

First Embodiment

FIG. 1 is a system block diagram showing an outline configuration of a fuel system 1A in the present embodiment.

The fuel system 1A of the present embodiment is mounted in an aircraft, pressurizes fuel that is retained in a fuel tank which is not shown in the drawings, and the fuel is supplied to an engine in a necessary amount. As shown in FIG. 1, the fuel system 1A of the present embodiment is provided with a main tube 1, a fuel pump mechanism 2, a measurement mechanism 3, an engine control unit (ECU) 4, a shut-off valve 5, and a connecting tube 6.

The main tube 1 is a pipe which connects the fuel tank and a combustor of the engine, and fuel N is guided from the left side in FIG. 1 (fuel tank side) toward the right side (engine side). The fuel pump mechanism 2 is disposed on the upstream of the measurement mechanism 3 in a flow direction of the main tube 1. The fuel pump mechanism 2 is provided with a centrifugal pump 2a, a filter 2b, a transmission 2c, and a transmission controller 2d.

The centrifugal pump 2a is attached to the main tube 1 in an inlet of the fuel pump mechanism 2. The centrifugal pump 2a is a pump which delivers the fuel N in the discharge pressure which is proportional to the square of the rotational speed, for example, when the rotation is high, the discharge pressure is high, and when the rotation is low, the discharge pressure is low. The filter 2b is disposed between the centrifugal pump 2a and a metering valve 3a described later, and minute foreign matter is removed which is included in the fuel N that flows through the main tube 1.

The transmission 2c connects an engine E and the centrifugal pump 2a, and the rotational speed of the rotational power which is discharged from the engine E (that is, the rotational speed of the engine E) is modified and transmitted to the centrifugal pump 2a. The transmission 2c is able to regulate the gear ratio, and is able to use, for example, a stepped transmission or a half toroidal CVT (stepless transmission).

The transmission controller 2d is integrally provided with the transmission 2c, and controls the gear ratio in the transmission 2c. A pressure P1 of the fuel N of the upstream of the metering valve 3a is transmitted to the transmission controller 2d via a first connecting tube 6a which is one connecting tube 6. In addition, a pressure P3 of the fuel N of the downstream of a throttling valve 3e which will be described later is transmitted to the transmission controller 2d via a second connecting tube 6b which is one connecting tube 6.

The transmission controller 2d in the present embodiment stores a setting value of a difference between the pressure P1 and the pressure P3 in advance, in a case where the difference between the pressure P1 and the pressure P3 is larger than the setting value, the gear ratio of the transmission 2c is controlled such that the rotational speed of the centrifugal pump 2a is low, and in a case where the difference between the pressure P1 and the pressure P3 is smaller than the setting value, the gear ratio of the transmission 2c is controlled such that the rotational speed of the centrifugal pump 2a is high. That is, such a transmission controller 2d controls the gear ratio of the transmission 2c according to the difference between the pressure P1 and the pressure P3. Thereby, a constant pressure difference between the pressure P1 and the pressure P3 is normally able to be maintained.

As shown in FIG. 1, the measurement mechanism 3 is disposed on the downstream of the fuel pump mechanism 2, and is provided with the metering valve 3a, an opening area regulating mechanism 3b, a displacement detector 3c, a filter 3d, the throttling valve 3e, and a pressure difference regulating valve 3f.

The metering valve 3a is provided in the main tube 1, and a flow amount of the fuel N which flows in the main tube 1 is regulated by regulating the opening area of the main tube 1. The opening area regulating mechanism 3b is attached to the metering valve 3a, and is, for example, an electrically driven actuator which drives the metering valve 3a based on a command from the ECU 4.

The displacement detector 3c is connected to the metering valve 3a, measures the opening area of the main tube 1 which is regulated by the metering valve 3a, and outputs the measurement result. Here, although not shown in FIG. 1, the displacement detector 3c is electrically connected to the ECU 4, and outputs the measurement result to the ECU 4.

The filter 3d is provided on a center part of a third connecting tube 6c which is one connecting tube 6 that connects the main tube 1 and an actuator A. The filter 3d removes minute foreign matter which remains in the fuel N that flows in the third connecting tube 6c. For this reason, it is possible to supply the fuel N with fewer impurities to the actuator A using the filter 3d.

The throttling valve 3e is provided in the main tube 1 on the downstream of the metering valve 3a, and regulates a pressure P2 of the fuel N between the metering valve 3a and the throttling valve 3e. The pressure difference regulating valve 3f is connected to a fourth connecting tube 6d which is a connecting tube 6 that transmits the pressure P1 of the fuel N on the upstream of the metering valve 3a, and a fifth connecting tube 6e which is one connecting tube 6 that transmits the pressure P2 of the fuel N between the metering valve 3a and the throttling valve 3e.

The pressure difference regulating valve 3f generates a driving fuel pressure which drives the throttling valve 3e such that the pressure difference between the pressure P1 and the pressure P2 is constant. The driving fuel pressure regulates the opening degree of the throttling valve 3e by being transmitted from the pressure difference regulating valve 3f to the throttling valve 3e via a sixth connecting tube 6f which is one connecting tube 6. The throttling valve 3e regulates the opening degree of the main tube 1 such that the pressure difference between the pressure P1 and the pressure P2 is constant. Thereby, the pressure difference between the upstream and the downstream of the metering valve 3a is normally constant regardless of the opening degree of the metering valve 3a, and the flow amount of the fuel N which is discharged to the downstream of the metering valve 3a is changed to depend only on the opening area of the main tube 1 which is regulated by the metering valve 3a. Consequently, it is possible to easily perform flow amount regulation of the fuel N using the metering valve 3a.

Operation information of an airframe or the engine E is input to the ECU 4, and the ECU 4 controls the opening area regulating mechanism 3b or the shut-off valve 5 based on the information. Here, originally, the ECU 4 is a controller unit which performs control of the entirety of the engine E, and does not belong only to the fuel system 1A of the present embodiment. That is, the ECU 4 performs control of the fuel system 1A of the present embodiment as a partial function, and functions as an arithmetic control member of the present disclosure. For example, such an ECU 4 stores a fuel amount which is necessary for the engine E in advance, and has the opening area regulating mechanism 3b regulate the opening degree of the metering valve 3a based on the fuel amount.

The connecting tube 6 is a tube which transmits the pressure of the main tube 1 and the like, and in the present embodiment, the first connecting tube 6a, the second connecting tube 6b, the third connecting tube 6c, the fourth connecting tube 6d, the fifth connecting tube 6e, and the sixth connecting tube 6f are provided. The first connecting tube 6a is connected to the upstream position of the metering valve 3a and the transmission controller 2d in the main tube 1, and transmits the pressure P1 to the transmission controller 2d. The second connecting tube 6b is connected to the downstream position of the throttling valve 3e and the transmission controller 2d in the main tube 1, and transmits the pressure P3 to the transmission controller 2d. The third connecting tube 6c is connected to the upstream position of the metering valve 3a and the actuator A in the main tube 1, and transmits the pressure P1 to the actuator A. The fourth connecting tube 6d is connected to the upstream position of the metering valve 3a and the pressure difference regulating valve 3f in the main tube 1, and transmits the pressure P1 to the pressure difference regulating valve 3f. The fifth connecting tube 6e is connected to a part between the metering valve 3a and the throttling valve 3e, and the pressure difference regulating valve 3f in the main tube 1, and transmits the pressure P2 to the pressure difference regulating valve 3f. The sixth connecting tube 6f is connected to the pressure difference regulating valve 3f and the throttling valve 3e, and transmits the driving fuel pressure which drives the throttling valve 3e to the throttling valve 3e.

In the fuel system 1A of the present embodiment which has such a configuration, when the centrifugal pump 2a is driven, the fuel N is pressure-fed at a discharge pressure according to the rotational speed of the centrifugal pump 2a. The fuel N which is supplied to the centrifugal pump 2a is regulated to the necessary flow amount in the engine E using the metering valve 3a after being pressurized by the centrifugal pump 2a. As shown in FIG. 1, the fuel N which is measured by the metering valve 3a is supplied to the combustor of the engine E via the heat exchanger K. Here, the heat exchanger K cools a lubricant oil by exchanging heat with the fuel N and the lubricant oil which is used by the engine E.

Here, the transmission controller 2d controls the gear ratio of the transmission 2c such that the pressure difference between the pressure P1 of the upstream on the metering valve 3a and the pressure P3 of the downstream of the throttling valve 3e becomes the setting value which is stored in advance. Furthermore, from the pressure difference regulating valve 3f, the pressure difference between the pressure P1 of the upstream of the metering valve 3a and the pressure P2 of the downstream thereof is transmitted to the throttling valve 3e, and the throttling valve 3e regulates the opening degree of the main tube 1 such that the pressure difference between the pressure P1 and a pressure P2 is constant.

According to the fuel system 1A of the present embodiment such as above, the engine E and the centrifugal pump 2a are connected via the transmission 2c which is able to regulate the gear ratio. For this reason, it is possible to modify the rotational speed of the centrifugal pump 2a without making the rotational speed of the centrifugal pump 2a proportional to the rotational speed of the engine E. Consequently, even in a case where the rotational speed of the engine E is low, it is possible to increase the rotational speed of the centrifugal pump 2a, and it is possible to secure a sufficient discharge pressure. According to the fuel system 1A of the present embodiment, it is possible to secure sufficient discharge pressure even when the rotational speed of the engine E is low without using a fixed volume pump in a fuel system 1A which has a centrifugal pump 2a which is driven by rotational power that is output from an aircraft engine E.

In addition, in the present embodiment, the metering valve 3a which regulates the flow amount of the fuel N which is discharged from the centrifugal pump 2a, the throttling valve 3e which is provided on the downstream of the metering valve 3a and regulates pressure of the fuel that passes through the metering valve 3a, and the transmission controller 2d which controls the gear ratio in the transmission 2c according to the pressure of the fuel N at the upstream position of the metering valve 3a and the pressure of the fuel N at the downstream position of the throttling valve 3e are provided. For this reason, it is possible to control the gear ratio of the transmission 2c in a simple configuration in which the number of electrical processes is minimized (that is, a configuration in which reliability is high).

In addition, in the present embodiment, for example, in a case where it is possible to control the rotational speed of the centrifugal pump 2a such that the pressure difference between the pressure P1 and the pressure P2 and the pressure difference between the pressure P1 and the pressure P3 are reduced, it is possible that energy effectiveness of the fuel system 1A is improved since it is possible to reduce pressure loss which is generated by the throttling valve 3e.

Second Embodiment

Next, a second embodiment of the present disclosure will be described below. Here, in the description of the present embodiment, a description of portions which are the same as those of the first embodiment is omitted or simplified.

Figure 2:
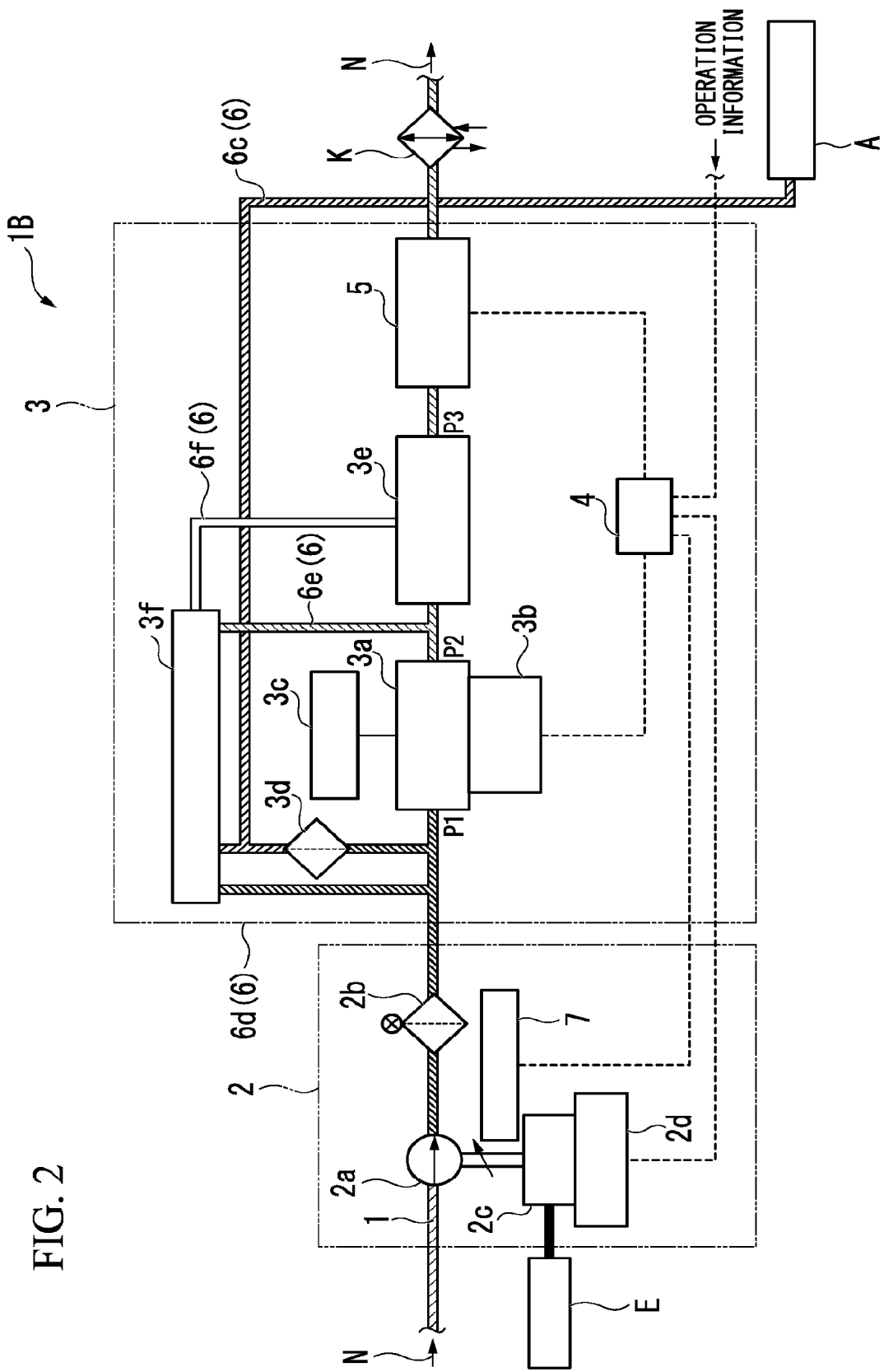
FIG. 2 is a system block diagram showing an outline configuration of a fuel system in a second embodiment of the present embodiment.

FIG. 2 is a system block diagram showing an outline configuration of a fuel system 1B in the present embodiment.

As shown in FIG. 2, the fuel system 1B of the present embodiment is not provided with the first connecting tube 6a and the second connecting tube 6b which are provided in the fuel system 1A of the first embodiment.

Meanwhile, the fuel system 1B of the present embodiment is provided with a rotational speed sensor 7 which measures the rotational speed of the centrifugal pump 2a. The rotational speed sensor 7 is electrically connected to the ECU 4, and the measurement value is output to the ECU 4.

The ECU 4 compares the rotational speed of the centrifugal pump 2a which generates necessary discharge pressure in order to supply the fuel N to the engine E from the operation information (aircraft speed, air temperature, engine rotational speed, throttle position, and the like) of the airframe or the engine E to the measurement value which is input from the rotational speed sensor 7. In addition, the ECU 4 sends the difference of the values (that is, comparison result) to the transmission controller 2d. The transmission controller 2d controls the gear ratio in the transmission 2c based on the comparison result which is input from the ECU 4.

According to the fuel system 1B of the present embodiment which adopts such a configuration, the rotational speed of the centrifugal pump 2a which shows the discharge pressure of the centrifugal pump 2a is measured by the rotational speed sensor 7, and the measurement value is input to the ECU 4 as an electrical signal. For this reason, for example, it is possible to have the transmission controller 2d control the gear ratio of the transmission 2c upon processing on the software with respect to the measurement value and the like by the ECU 4. For this reason, it is possible to arbitrarily and most appropriately regulate the gear ratio of the transmission 2c using operation conditions or the like of the aircraft.

Third Embodiment

Next, a third embodiment of the present disclosure will be described below Here, in the description of the present embodiment, a description of portions which are the same as those of the first embodiment is omitted or simplified.

Figure 3:
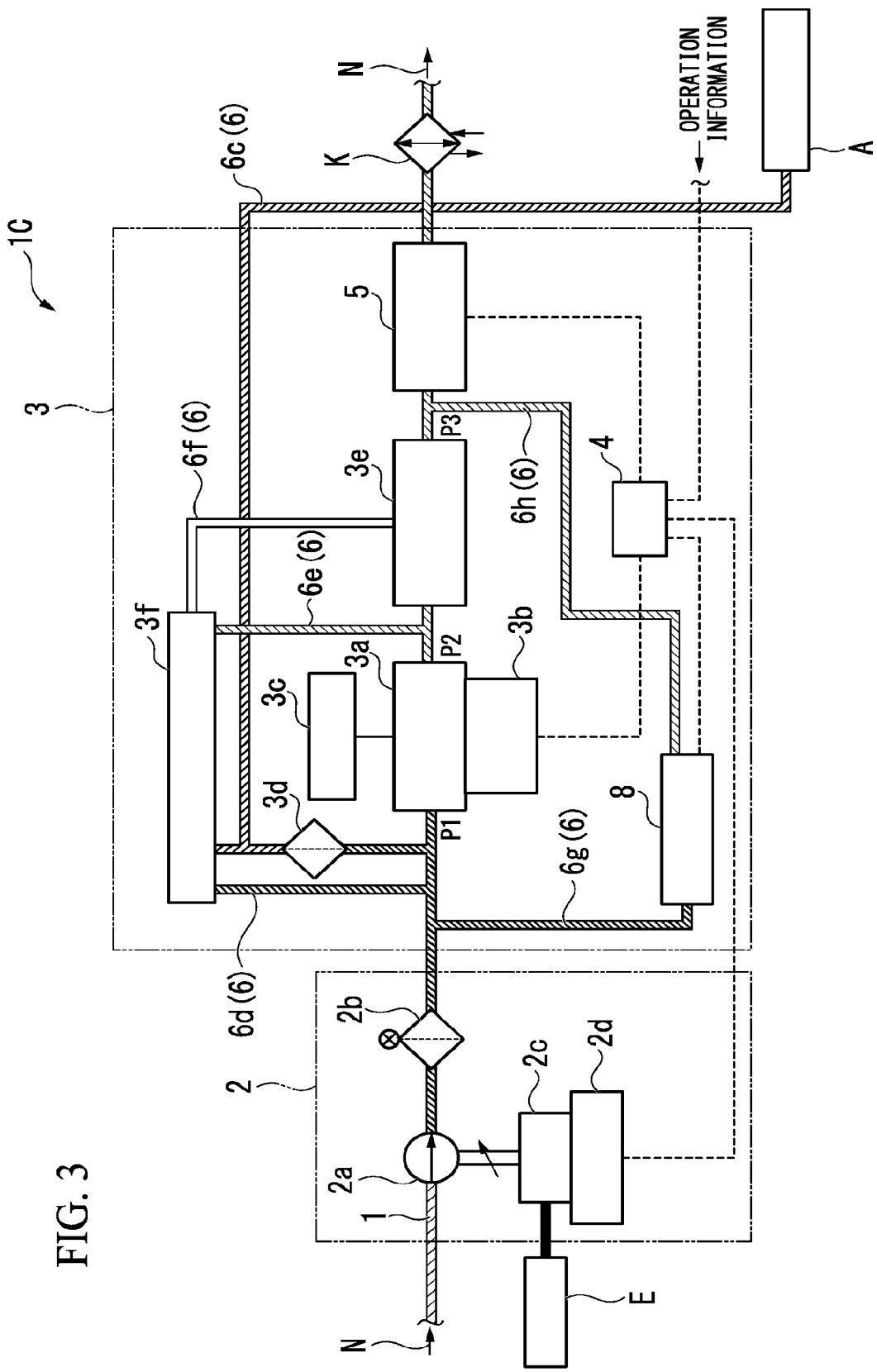
FIG. 3 is a system block diagram showing an outline configuration of a fuel system in a third embodiment of the present embodiment.

FIG. 3 is a system block diagram showing an outline configuration of a fuel system 1C in the present embodiment.

As shown in FIG. 3, the fuel system 1C of the present embodiment is not provided with the first connecting tube 6a and the second connecting tube 6b which are provided in the fuel system 1A of the first embodiment. Meanwhile, the fuel system 1C of the present embodiment is provided with a seventh connecting tube 6g which is a connecting tube 6 which transmits the pressure P1 of the upstream of the metering valve 3a by being connected to the main tube 1, an eighth connecting tube 6h which is a connecting tube 6 which transmits the pressure P3 of the downstream of the throttling valve 3e by being connected to the main tube 1, and a pressure difference sensor 8 which connects to the seventh connecting tube 6g and the eighth connecting tube 6h. The pressure difference sensor 8 is connected to the ECU 4, and the pressure difference between the pressure P1 and the pressure P3 are output to the ECU 4 as a measurement result.

The ECU 4 compares the measurement value of the pressure difference sensor 8 and the setting value which is stored in advance, and the difference of the values (that is, comparison result) is sent to the transmission controller 2d. The transmission controller 2d controls the gear ratio in the transmission 2c based on the comparison result which is input from the ECU 4.

According to the fuel system 1C of the embodiment which adopts such a configuration, the difference between the pressure P1 and the pressure P3 is measured by the pressure difference sensor 8, and the measurement value is input to the ECU 4 as an electrical signal. For this reason, for example, it is possible to have the transmission controller 2d control the gear ratio of the transmission 2c upon processing on the software with respect to the measurement value and the like by the ECU 4.

For this reason, it is possible to arbitrarily and most appropriately regulate the gear ratio of the transmission 2c using operation conditions or the like of the aircraft.

Fourth Embodiment

Next, a fourth embodiment of the present disclosure will be described below. Here, in the description of the present embodiment, a description of portions which are the same as those of the first embodiment is omitted or simplified.

Figure 4:
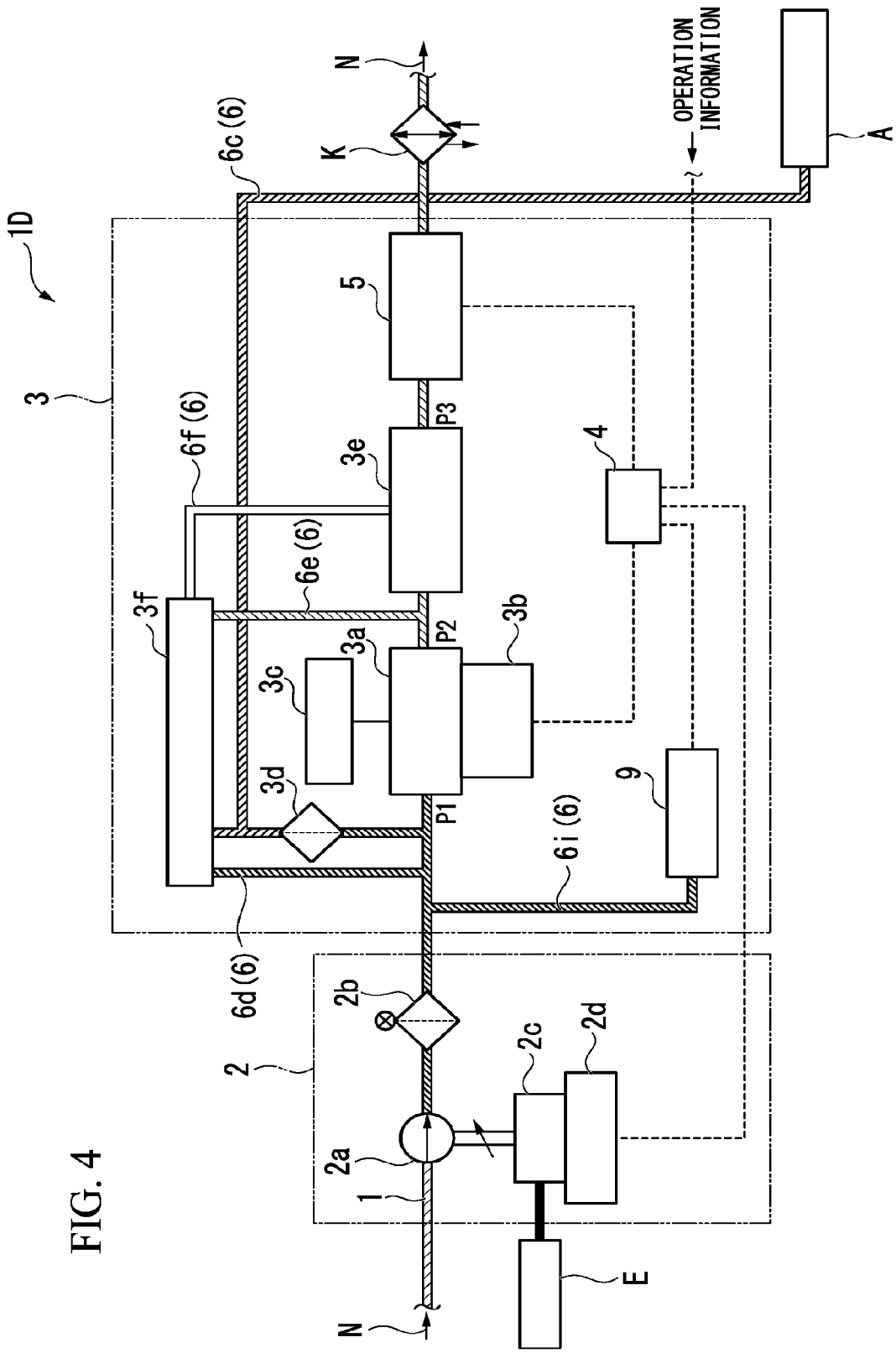
FIG. 4 is a system block diagram showing an outline configuration of a fuel system in a fourth embodiment of the present embodiment.

FIG. 4 is a system block diagram showing an outline configuration of a fuel system 1D in the present embodiment.

As shown in FIG. 4, the fuel system 1D of the present embodiment is not provided with the first connecting tube 6a and the second connecting tube 6b which are provided in the fuel system 1A of the first embodiment. Meanwhile, the fuel system 1D of the present embodiment is provided with a ninth connecting tube 6i that is a connecting tube 6 through which the pressure P1 on the upstream of the metering valve 3a is transmitted by being connected to the main tube 1, and a pressure sensor 9 which is connected to the ninth connecting tube 6i. The pressure sensor 9 is connected to the ECU 4, the pressure P1 is measured, and the measurement value is output toward the ECU 4.

The ECU 4 determines the necessary discharge pressure to supply the fuel N to the engine E from operation information on the airframe or the engine E, and compares the necessary discharge pressure to the measurement value which is input from the pressure sensor 9. In addition, the ECU 4 sends the difference of the values (that is, comparison result) to the transmission controller 2d. The transmission controller 2d controls the gear ratio in the transmission 2c based on the comparison result which is input from the ECU 4.

According to the fuel system 1D of the present embodiment which adopts such a configuration, the discharge pressure of the centrifugal pump 2a is measured by the pressure sensor 9, and the measurement value is input to the ECU 4 as an electrical signal. For this reason, for example, it is possible to have the transmission controller 2d control the gear ratio of the transmission 2c upon processing on the software with respect to the measurement value and the like by the ECU 4. For this reason, it is possible to arbitrarily and most appropriately regulate the gear ratio of the transmission 2c using operation conditions or the like of the aircraft.

Fifth Embodiment

Next, a fifth embodiment of the present disclosure will be described below. Here, in the description of the present embodiment, a description of portions which are the same as those of the first embodiment is omitted or simplified.

Figure 5:
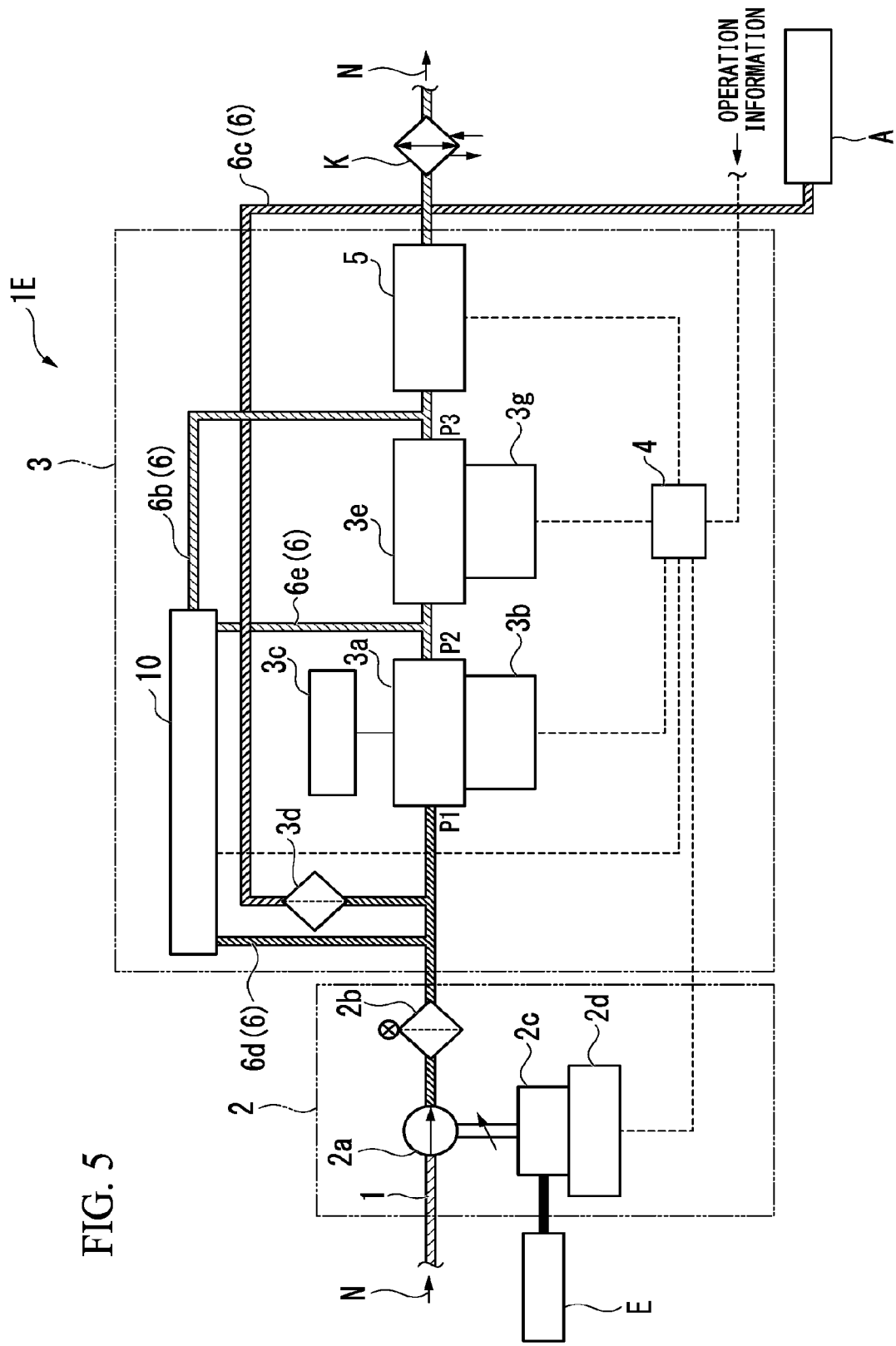
FIG. 5 is a system block diagram showing an outline configuration of a fuel system in a fifth embodiment of the present embodiment.

FIG. 5 is a system block diagram showing an outline configuration of a fuel system 1E in the present embodiment.

As shown in FIG. 5, the fuel system 1E of the present embodiment is not provided with the first connecting tube 6a, the sixth connecting tube 6f, and the pressure difference regulating valve 3f which are provided in the fuel system 1A of the first embodiment. Meanwhile, the fuel system 1E of the present embodiment is provided with a pressure difference sensor 10 which is connected to the second connecting tube 6b, the fourth connecting tube 6d, and the fifth connecting tube 6e, and the opening area regulating mechanism 3g which regulates the opening area of the throttling valve 3e.

The pressure difference sensor 10 is electrically connected to the ECU 4, the difference between the pressure P1 and the pressure P2, and the difference between the pressure P1 and the pressure P3 (or the pressure difference between the pressure P2 and the pressure P3) are measured, and the measurement result is output toward the ECU 4.

The ECU 4 has the transmission controller 2d control the gear ratio of the transmission 2c such that the difference between the pressure P1 and the pressure P3 is constant at a setting value which is set in advance. In addition, the ECU 4 has the opening area measurement mechanism 3g regulate the opening area of the throttling valve 3e such that the difference between the pressure P1 and the pressure P2 is constant at a setting value which is set in advance.

According to the fuel system 1E of the present embodiment which adopts such a configuration, the difference between the pressure P1 and the pressure P2, and the difference between the pressure P1 and the pressure P3 are measured by the pressure difference sensor 10, and the measurement value is input to the ECU 4 as an electrical signal. For this reason, for example, it is possible to have the transmission controller 2d control the gear ratio of the transmission 2c upon processing on the software with respect to the measurement value and the like by the ECU 4. For this reason, it is possible to arbitrarily and most appropriately regulate the gear ratio of the transmission 2c using operation conditions or the like of the aircraft.

Sixth Embodiment

Next, a sixth embodiment of the present disclosure will be described below. Here, in the description of the present embodiment, a description of portions which are the same as those of the first embodiment is omitted or simplified.

Figure 6:
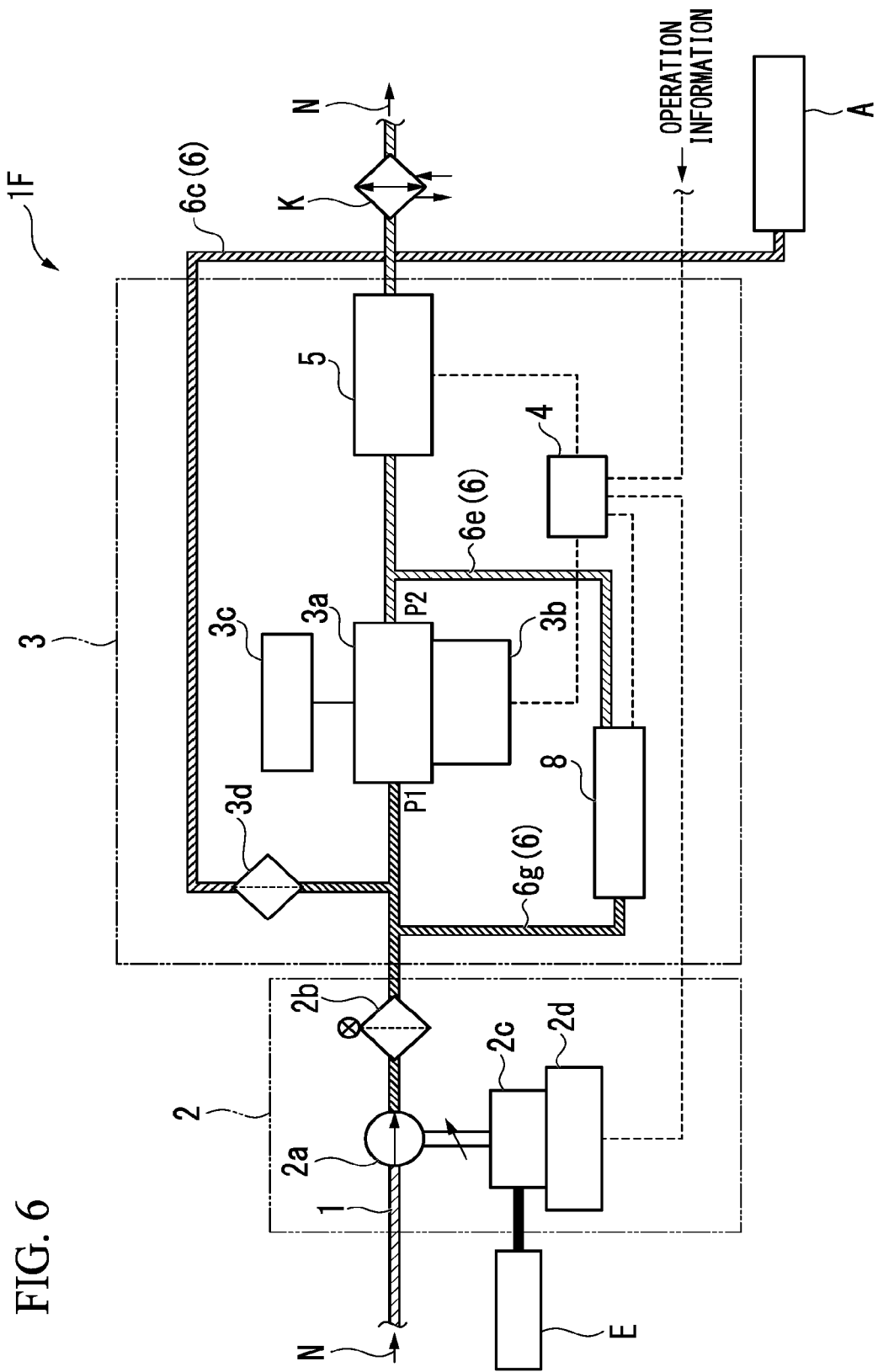
FIG. 6 is a system block diagram showing an outline configuration of a fuel system in a sixth embodiment of the present embodiment.

FIG. 6 is a system block diagram showing an outline configuration of a fuel system 1F in the present embodiment.

As shown in FIG. 6, the fuel system 1F of the present embodiment is not provided with the first connecting tube 6a, the second connecting tube 6b, the sixth connecting tube 6f, and the pressure difference regulating valve 3f which are provided in the fuel system of the first embodiment. Meanwhile, the fuel system 1F of the present embodiment is provided with the seventh connecting tube 6g and the pressure difference sensor 8 which are described in the third embodiment. The pressure difference sensor 8 is connected to the seventh connecting tube 6g and the fifth connecting tube 6e, determines the pressure difference between the pressure P1 and the pressure P2, and the difference is output to the ECU 4 as the measurement result.

The ECU 4 calculates discharge pressure of the centrifugal pump 2a such that the measurement value which is input from the pressure difference sensor 8 is constant at a setting value which is set in advance, and the discharge pressure is sent to the transmission controller 2d. The transmission controller 2d controls the gear ratio in the transmission 2c based on the value which is input from the ECU 4.

According to the fuel system 1F of the present embodiment which adopts such a configuration, since the pressure difference regulating valve 3f is not provided, a reduction in size and simplification of the fuel system 1F is achieved. However, in order to realize the fuel system 1F of the present embodiment, it is necessary to make a response speed sufficiently fast with respect to a command which is input from the transmission controller 2d of the transmission 2c.

Seventh Embodiment

Next, a seventh embodiment of the present disclosure will be described below. Here, in the description of the present embodiment, a description of portions which are the same as those of the first embodiment is omitted or simplified.

Figure 7:
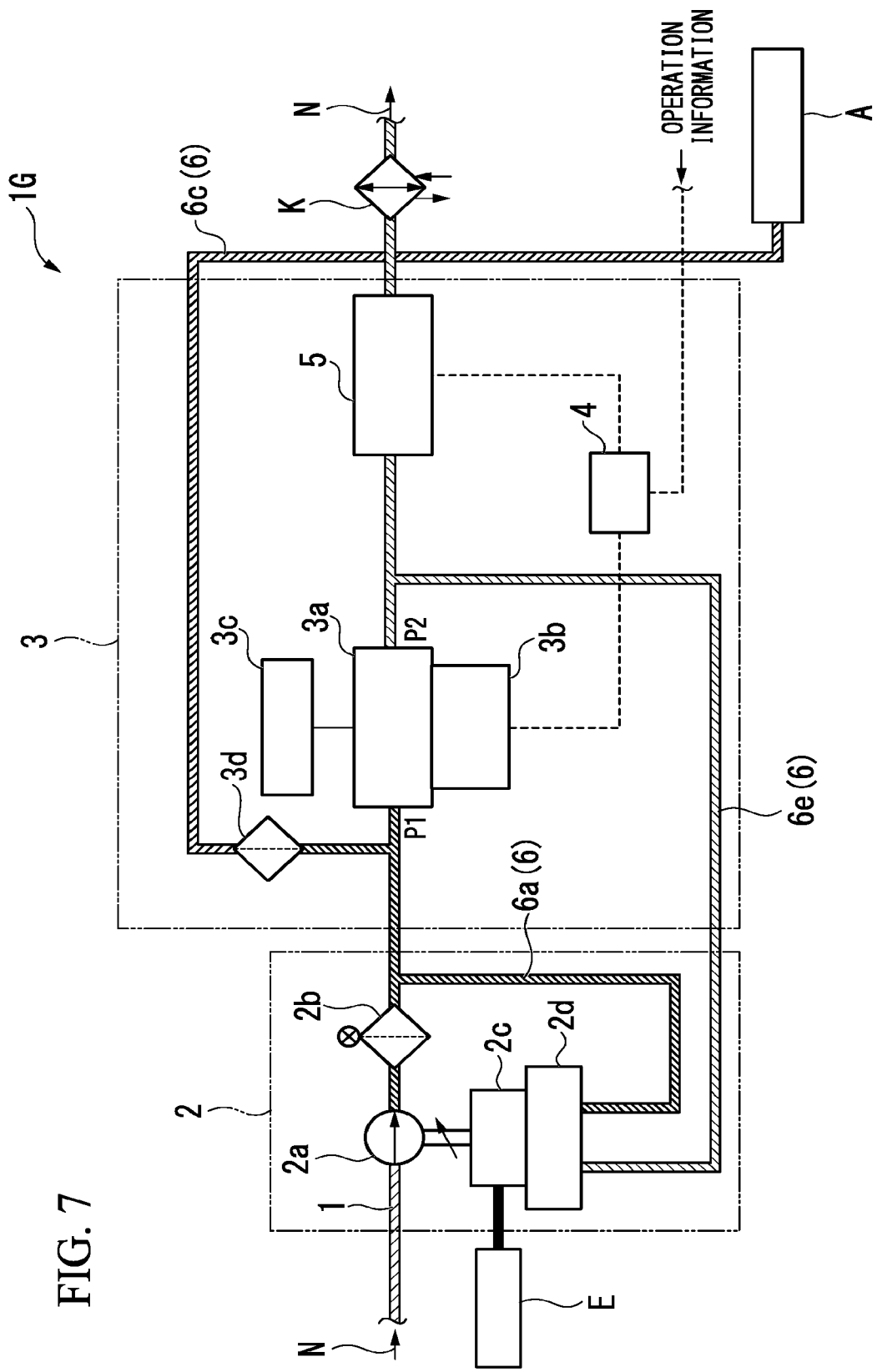
FIG. 7 is a system block diagram showing an outline configuration of a fuel system in a seventh embodiment of the present embodiment.

FIG. 7 is a system block diagram showing an outline configuration of a fuel system 1G in the present embodiment.

As shown in FIG. 7, the fuel system 1G of the present embodiment is not provided with the second connecting tube 6b, the sixth connecting tube 6f, and the pressure difference regulating valve 3f which are provided in the fuel system 1A of the first embodiment.

In the fuel system 1G of the present embodiment, the fifth connecting tube 6e is connected to the transmission controller 2d, and the transmission controller 2d controls the gear ratio of the transmission 2c according to the difference between the pressure P1 and the pressure P2. Thereby, a constant pressure difference between the pressure P1 and the pressure P2 is normally able to be maintained.

According to the fuel system 1G of the present embodiment which adopts such a configuration, since the pressure difference regulating valve 3f is not provided, a reduction in size and simplification of the fuel system 1G is achieved. However, in order to realize the fuel system 1G of the present embodiment, it is necessary to make a response speed sufficiently fast with respect to a command which is input from the transmission controller 2d of the transmission 2c.

Eighth Embodiment

Next, an eighth embodiment of the present disclosure will be described below. Here, in the description of the present embodiment, a description of portions which are the same as those of the first embodiment is omitted or simplified.

Figure 8:
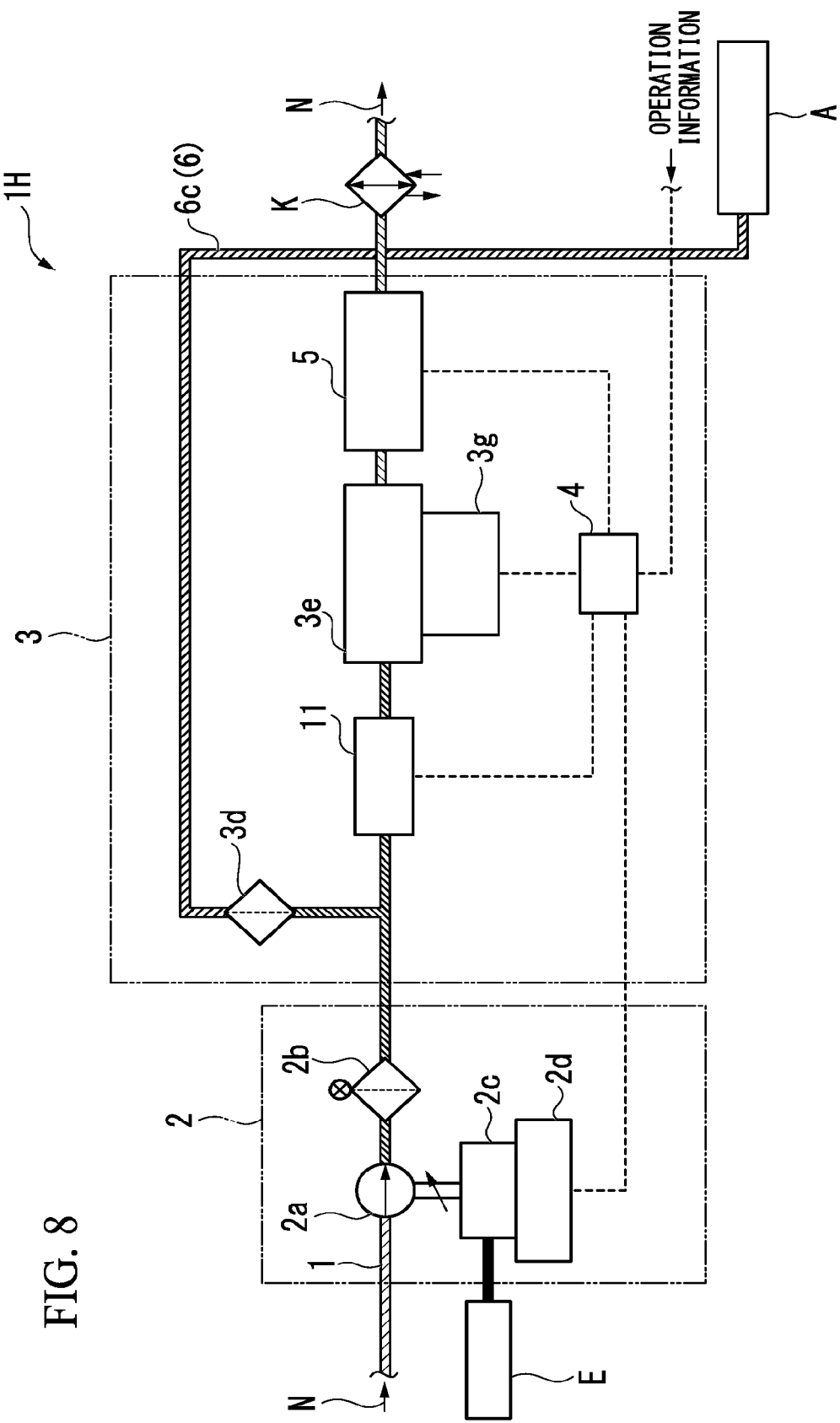
FIG. 8 is a system block diagram showing an outline configuration of a fuel system in an eighth embodiment of the present embodiment.

FIG. 8 is a system block diagram showing an outline configuration of a fuel system 1H in the present embodiment.

As shown in FIG. 8, the fuel system 1H of the present embodiment is not provided with the first connecting tube 6a, the second connecting tube 6b, the metering valve 3a, the opening area regulating mechanism 3b, the displacement detector 3c, and the pressure difference regulating valve 3f which are provided in the fuel system 1A of the first embodiment. Meanwhile, the fuel system 1H of the present embodiment is provided with a flowmeter 11 which is provided in the main tube 1 on the upstream of the throttling valve 3e and an opening area regulating mechanism 3g which is described in the fifth embodiment.

The flowmeter 11 measures the flow amount of the fuel N which flows through the main tube 1, and outputs a measurement value to the ECU 4. The ECU 4 determines the fuel amount which is necessary for the engine E from the operation information of the airframe or the engine E, and furthermore, compares the determined fuel amount and the measurement value which is input from the flowmeter 11. In addition, the ECU 4 sends the difference of the values (that is, comparison result) to the transmission controller 2d. The transmission controller 2d controls the gear ratio in the transmission 2c based on the comparison result which is input from the ECU 4.

In addition, when the ECU 4 determines that the response speed of the transmission 2c does not correspond to the rate of change of the supply amount of the fuel N to the engine E, the opening degree of the throttling valve 3e is regulated by the opening area regulating mechanism 3g which has a faster response speed than the transmission 2c due to a simple configuration, and the fuel N is rapidly supplied to the engine E in an appropriate amount.

According to the fuel system 1H of the present embodiment which adopts such a configuration, the discharge amount of the centrifugal pump 2a is measured by the flowmeter 11, and the measurement value is input to the ECU 4 as an electrical signal. For this reason, for example, it is possible to have the transmission controller 2d control the gear ratio of the transmission 2c upon processing on the software with respect to the measurement value and the like by the ECU 4. For this reason, it is possible to arbitrarily and most appropriately regulate the gear ratio of the transmission 2c using operation conditions or the like of the aircraft.

Figure 9:
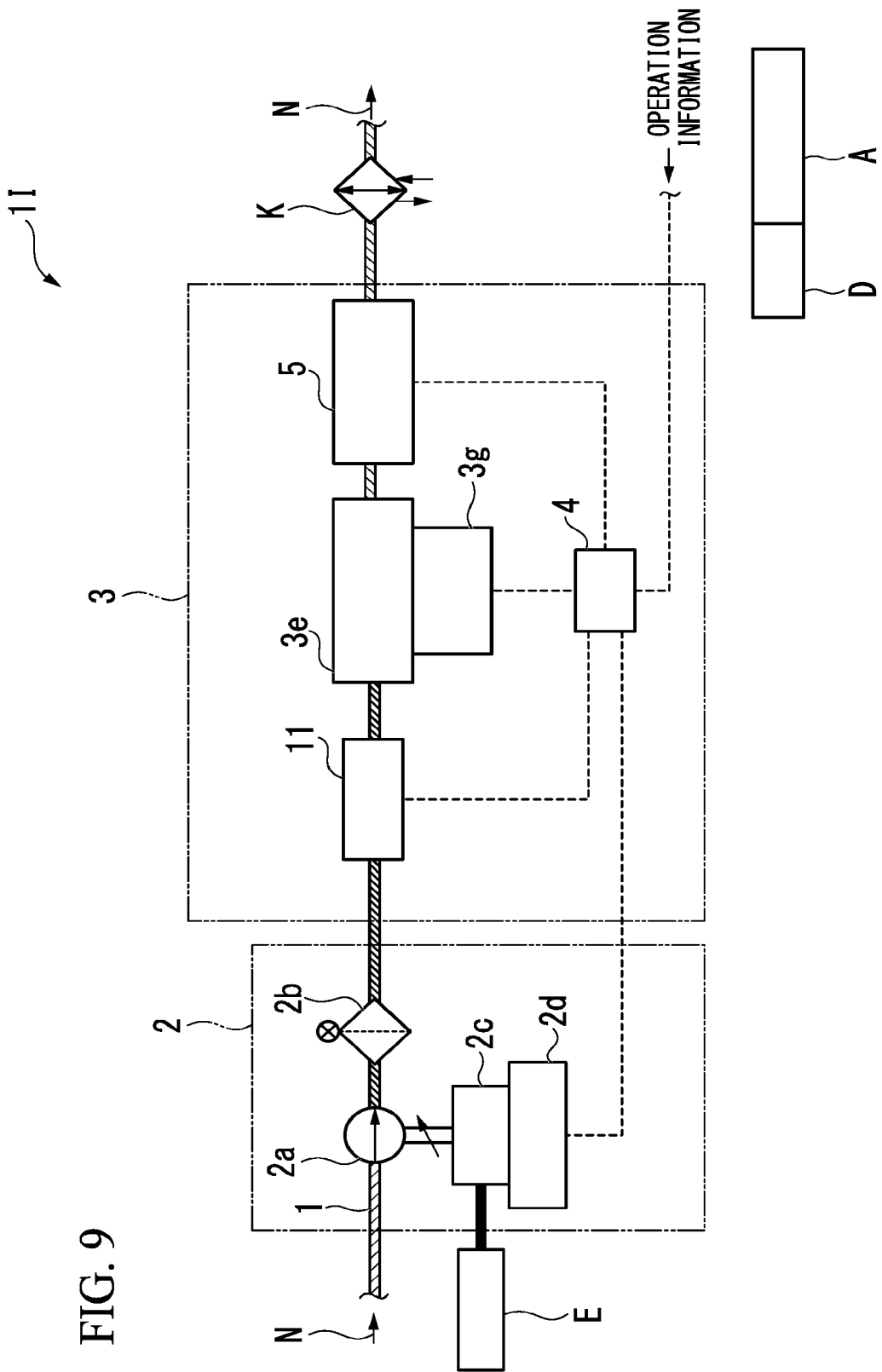
FIG. 9 is a system block diagram showing an outline configuration of a modified example of a fuel system in the eighth embodiment of the present embodiment.

Here, since the flow amount of the fuel N which flows through the main tube 1 varies when the actuator A is driven, in a case where control is performed at a flow amount of the fuel N as in the present embodiment, there is a possibility that the driving of the actuator A influences a fuel amount which is supplied to the engine E. For this reason, as shown in the fuel system 1I of FIG. 9, the driving of the actuator A may be performed by a dedicated power source D.

Ninth Embodiment

Next, a ninth embodiment of the present disclosure will be described below. Here, in the description of the present embodiment, a description of portions which are the same as those of the first embodiment is omitted or simplified.

Figure 10:
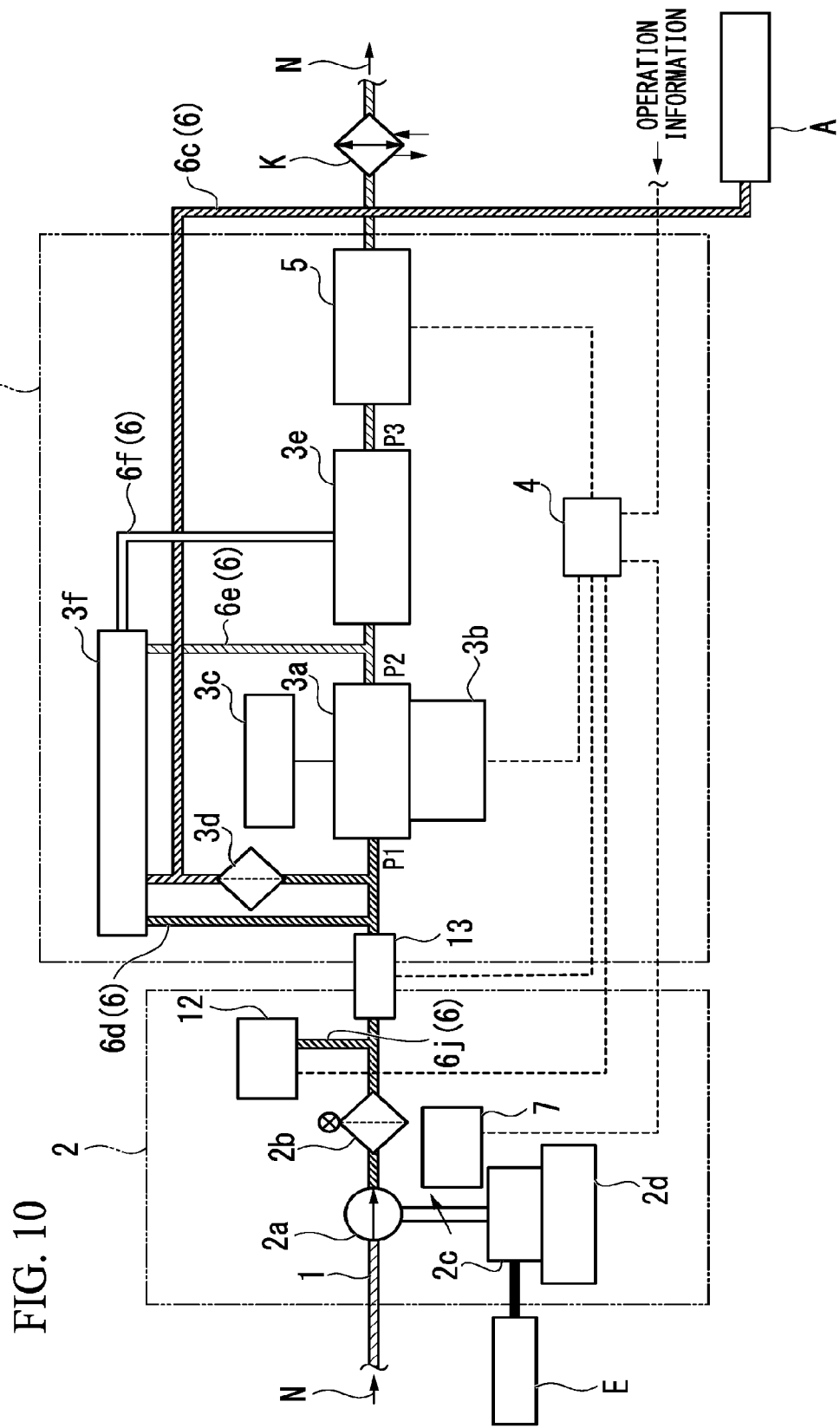
FIG. 10 is a system block diagram showing an outline configuration of a fuel system in a ninth embodiment of the present embodiment.

FIG. 10 is a system block diagram showing an outline configuration of a fuel system 1J in the present embodiment. As shown in FIG. 10, the fuel system 1J of the present embodiment is provided with the rotational speed sensor 7 which is described in the second embodiment, a pressure sensor 12 which is connected to the main tube 1 via a tenth connecting tube 6j which is one connecting tube 6, and a flowmeter 13 which is provided in the main tube 1.

The rotational speed sensor 7 measures the rotational speed of the centrifugal pump 2a, and the measurement value is output to the ECU 4. The pressure sensor 12 measures the discharge pressure of the centrifugal pump 2a, and the measurement value is output to the ECU 4. The flowmeter 13 measures a discharge flow amount of the centrifugal pump 2a, and the measurement value is output to the ECU 4.

The ECU 4 stores the rotational speed of the centrifugal pump 2a, the discharge pressure of the centrifugal pump 2a, and a normal value of the discharge flow amount of the centrifugal pump 2a in advance, and detects an abnormality when any one of the measurement value of the rotational speed sensor 7, the measurement value of the pressure sensor 12, and the measurement value of the flowmeter 13 diverge from the normal value.

According to the fuel system 1J of the present embodiment, when a defect is generated in the centrifugal pump 2a or the like, it is possible to detect the abnormality. Here, it is not necessary to install all of the rotational speed sensor 7, the pressure sensor 12, and the flowmeter 13, and any one or two may be installed.

Tenth Embodiment

Next, a tenth embodiment of the present disclosure will be described below. Here, in the description of the present embodiment, a description of portions which are the same as those of the first embodiment is omitted or simplified.

Figure 11:
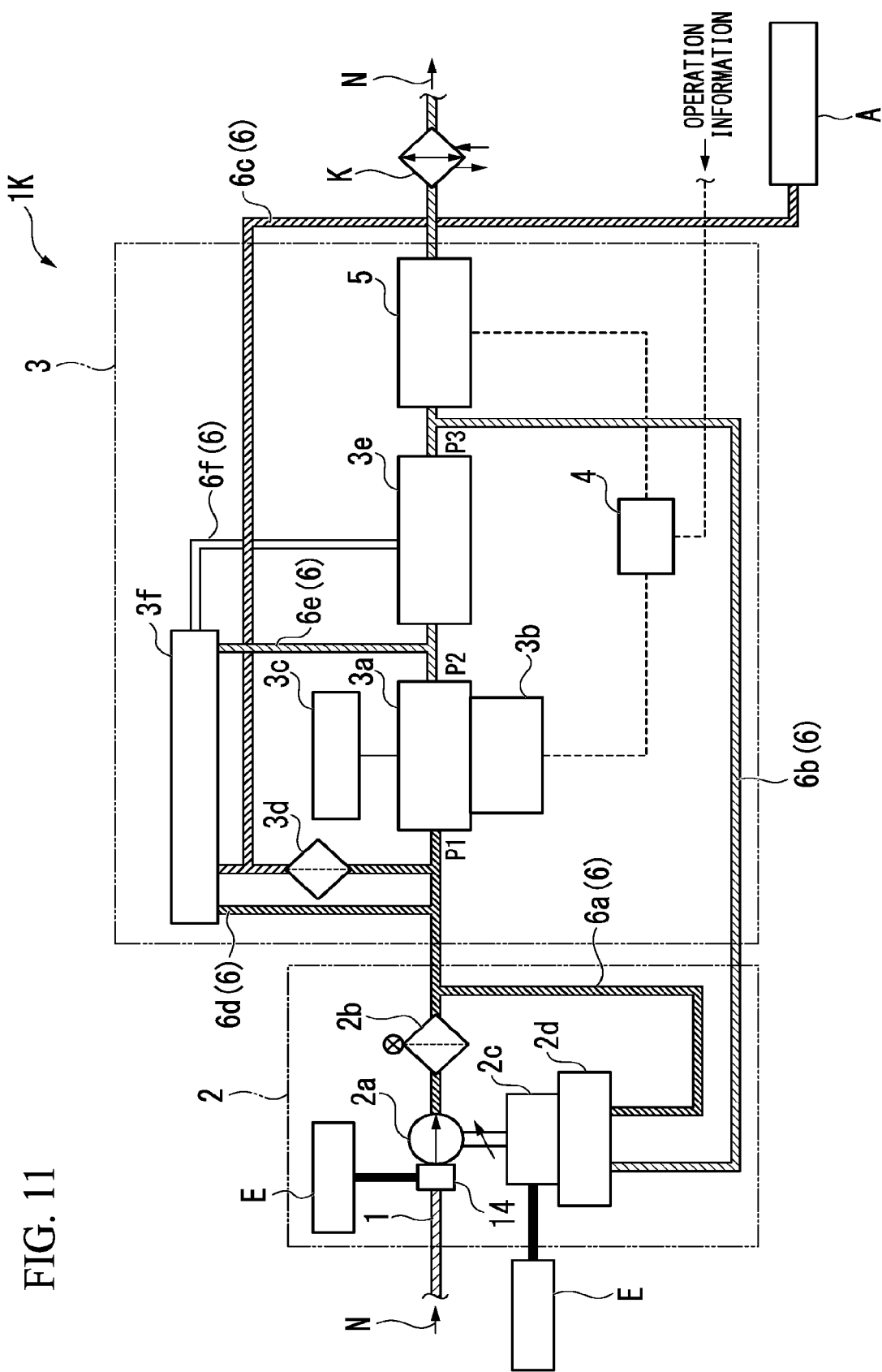
FIG. 11 is a system block diagram showing an outline configuration of a fuel system in a tenth embodiment of the present embodiment.

FIG. 11 is a system block diagram showing an outline configuration of a fuel system 1K in the present embodiment. As shown in FIG. 11, the fuel system 1K of the present embodiment is provided with an inducer 14 which is installed on the upstream side of the centrifugal pump 2a and is driven proportionally to the rotational power which is output from the engine E. The inducer 14 pressurizes the fuel N which flows through the main tube 1.

Similarly to the embodiments described above, in the fuel system 1K of the present embodiment, the rotational speed of the centrifugal pump 2a is not proportional to the rotational speed of the engine E due to the transmission 2c. For this reason, in a case where the inducer is used which is incorporated in the centrifugal pump 2a, the rotational speed of the inducer is not proportional to the rotational speed of the engine E. Here, it is possible that the inducer is not designed by assuming a lower speed rotation than the rotational speed of the engine E, and it is possible that the the original performance is not exerted by the low speed rotation. In contrast to this, according to the fuel system 1K of the present embodiment, the inducer 14 is provided independently to the centrifugal pump 2a, and is driven so as to be proportional to the rotational speed of the engine E, therefore it is possible to exert the original performance of the inducer 14.

Here, the configuration of the present embodiment is able to be used in combination to the other embodiments described above.

Appropriate embodiments of the present disclosure are described above referring to the drawings, but the present disclosure is not limited to the embodiments described above. Various forms, combinations, and the like of each configuring member which is indicated in the embodiments are described above as examples, and various modifications are possible based on design requirements and the like within a range of the present disclosure.

INDUSTRIAL APPLICABILITY

According to the present disclosure, it is possible to modify the rotational speed of the centrifugal pump without being proportional to the rotational speed of the engine. Consequently, even in a case where the rotational speed of the engine is low, it is possible to increase the rotational speed of the centrifugal pump, and it is possible to secure a sufficient discharge pressure. According to the present disclosure, it is possible to secure sufficient discharge pressure even when the rotational speed of the engine is low without using a fixed volume pump in a fuel system which has a centrifugal pump which is driven by rotational power that is output from an aircraft engine.

What is claimed is:

1. A fuel system comprising:
   a centrifugal pump which pressurizes and delivers fuel that is supplied to an aircraft engine;
   a transmission which connects the engine and the centrifugal pump to each other, is able to regulate a gear ratio and modifies and transmits a rotational speed of a rotational power that is output from the engine to the centrifugal pump;
   a metering valve which regulates a flow amount of the fuel that is discharged from the centrifugal pump;
   a throttling valve which is provided downstream of the metering valve and regulates pressure of the fuel that passes through the metering valve; and
   a transmission controller that controls the gear ratio in the transmission such that a difference of the pressure of the fuel upstream of the metering valve and the pressure of the fuel downstream of the throttling valve is constant.

2. The fuel system according to claim 1, further comprising:
   an inducer which is disposed on the upstream of the centrifugal pump and drives proportionally to the rotational power which is output from the engine.

3. A fuel system comprising:
   a centrifugal pump which pressurizes and delivers fuel that is supplied to an aircraft engine;
   a transmission which connects the engine and the centrifugal pump to each other, is able to regulate a gear ratio and modifies and transmits a rotational speed of a rotational power that is output from the engine to the centrifugal pump;
   a metering valve which regulates a flow amount of the fuel that is discharged from the centrifugal pump;
   a throttling valve which is provided downstream of the metering valve and regulates pressure of the fuel that passes through the metering valve;

a pressure difference sensor which measures a difference between the pressure of the fuel upstream of the metering valve and the pressure of the fuel downstream of the throttling valve;

an arithmetic control member which compares a setting value and the measurement result of the pressure difference sensor; and a transmission controller that controls the gear ratio in the transmission based on the comparison result of the arithmetic control member in accordance with the difference of the pressure of the fuel upstream of the metering valve and the pressure of the fuel downstream of the throttling valve.

4. The fuel system according to claim 3, further comprising:

an inducer which is disposed on the upstream of the centrifugal pump and drives proportionally to the rotational power which is output from the engine.

5. A fuel system comprising:

a centrifugal pump which pressurizes and delivers fuel that is supplied to an aircraft engine;

a transmission which connects the engine and the centrifugal pump to each other, is able to regulate a gear ratio and modifies and transmits a rotational speed of a rotational power that is output from the engine to the centrifugal pump;

a metering valve which regulates a flow amount of the fuel that is discharged from the centrifugal pump;

a throttling valve which is provided downstream of the metering valve and regulates pressure of the fuel that passes through the metering valve;

a pressure difference sensor which measures a difference between the pressure of the fuel upstream of the metering valve and the pressure of the fuel downstream of the throttling valve, and a difference between the pressure of the fuel upstream of the metering valve and the pressure of the fuel between the metering valve and the throttling valve;

an arithmetic control member which compares a setting value to the measurement result of the pressure difference sensor and controls an opening area of the throttling valve; and a transmission controller that controls the gear ratio in the transmission based on the comparison result of the arithmetic control member such that the difference between the pressure of the fuel upstream of the metering valve and the pressure of the fuel downstream of the throttling valve, and the difference between the pressure of the fuel upstream of the metering valve and the pressure of the fuel between the metering valve and the throttling valve are respectively constant.

6. The fuel system according to claim 5, further comprising:

an inducer which is disposed on the upstream of the centrifugal pump and drives proportionally to the rotational power which is output from the engine.

\* \* \* \* \*